(No Model.)
R. GOODBODY.
AUTOMATIC VISIBLE FEED INJECTOR.
No. 423,758. Patented Mar. 18, 1890.
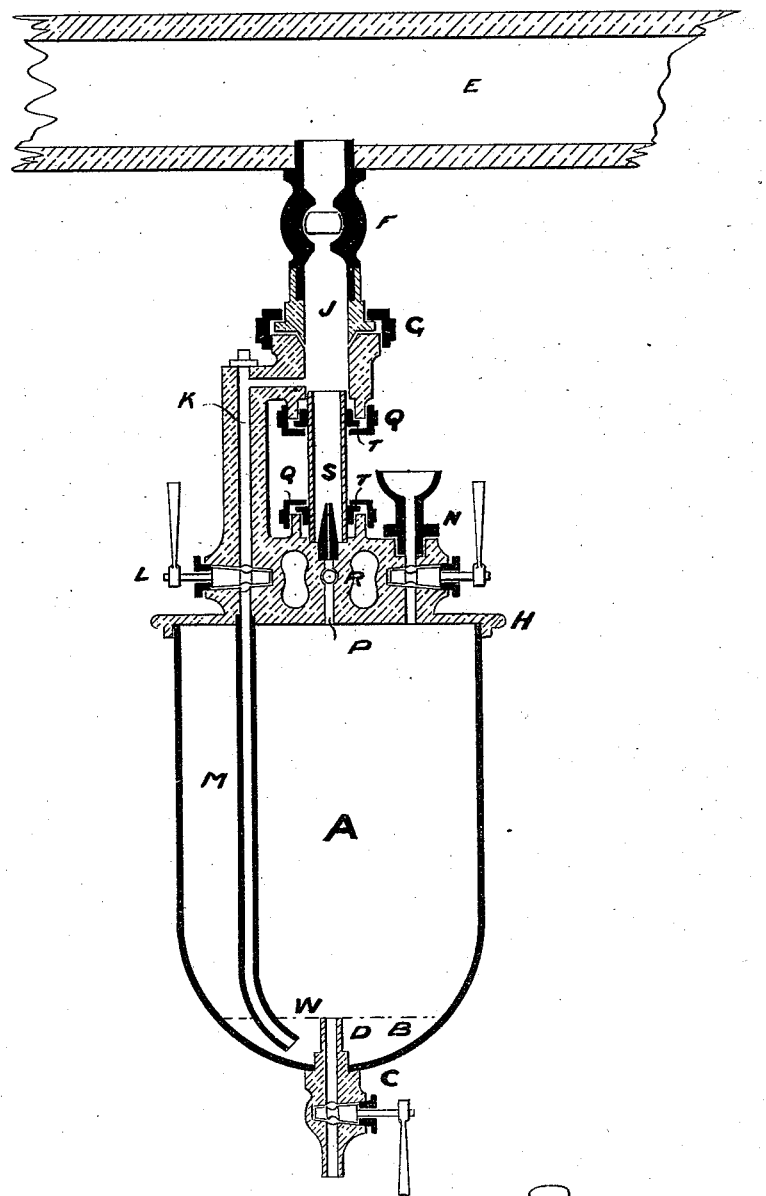

UNITED STATES PATENT OFFICE.

ROBERT GOODBODY, OF CLARA, COUNTY OF KINGS, IRELAND.

AUTOMATIC VISIBLE-FEED INJECTOR.

SPECIFICATION forming part of Letters Patent No. 423,758, dated March 18, 1890.

Application filed October 10, 1889. Serial No. 326,628. (No model.)

*To all whom it may concern:*

Be it known that I, ROBERT GOODBODY, a subject of the Queen of Great Britain and Ireland, and residing at Clara, Kings county, Ireland, have invented an Automatic Visible-Feed Injector, of which the following is a specification.

This invention relates to the construction and arrangement of apparatus whereby a liquid compound is automatically and regularly discharged from a receptacle and caused to flow along with the feed-water to the boiler, for the very desirable object of preventing or greatly reducing the formation of scale in boilers, and also for the purpose of separating such scale when so formed from the plates, so that the same can be removed without resorting to the use of implements which are injurious to the plates of which the boiler is composed, and thereby materially adding to the efficiency of the boiler and effecting a great saving of labor.

In order to accomplish my object I have tried several well-known sight-feed lubricators used for the lubrication of the internal surface of engine cylinders and valves; but none of these would answer my requirements.

My improvement consists of a vessel having an internal pipe suitably connected with the feed-pipe, through which the feed-water is made to pass to a boiler or to a range of boilers. The vessel has a vertical outlet from the apparatus to the feed-pipe, a certain length of such vertical connection being of glass, in order that there may be evidence of the duty performed by the apparatus. The bottom of the vessel is provided with a clearing-cock, which has a pipe carried up inside to a point above the bottom of the receptacle. Branching from the vertical connection with feed-pipe to the right or left, from a point above the top of the glass, a passage is made in connection with a pipe through the inside of the receptacle to the bottom of the vessel or receptacle, terminating near the bottom below the top of the before-named pipe connected to the clearance-cock at the bottom of the vessel.

The invention is illustrated by the accompanying drawing, in which the figure is a vertical central sectional view of an apparatus embodying my invention.

In the drawing, the letter A indicates the vessel for containing the liquid compound to be delivered to the feed-water flowing through the feed-water pipe E to a boiler or range of boilers.

The vessel A is provided with a cover-cap H, having a vertical tubular connection with the feed-pipe, which connection is for a part or all of its length transparent. As here shown, the connection comprises a vertical passage P in the cover-cap, and a glass tube S, communicating at its lower end with said passage and at its upper end with a tubular branch K, leading down to and through the cover-cap and connected with a tube M, which has its lower end curved and arranged in proximity to the bottom of the vessel A. A coupling J connects the upper end of the branch K with the feed-pipe and completes the communication between the latter, the branch, and the glass tube S. An outlet or clearance cock C is attached to the bottom wall of the vessel A, and is provided with a pipe-extension D, rising a short distance in the vessel above the inside of its lowermost portion B, and above the lower extremity of the tube M, in such manner that a water seal, as at W, is constantly preserved at the lower end of the said tube.

The branch K is provided with a valve L, and the cover-cap with a filling-cup N, for supplying the vessel A, while a valve F in the coupling J controls communication between the feed-pipe, the branch K, and vertical connection or passage-way S. A valve R is placed in the passage P to control communication between the tube S and the vessel A. A coupling-ring Q, with a flange r, may be used to attach the glass or other transparent tube S to the upper end of the branch K.

In operation the vessel A is supplied, through the filling-cup N, with a liquid compound somewhat lighter than water, which compound floats on the water that cannot leave the vessel below the upper end of the pipe-extension D, whereby the lower end of the tube M is constantly immersed in water below the liquid compound floating thereupon. The valves F and L being opened, communication is established with the bottom of the vessel by the tube M, and on opening valve R the light compound is injected through the vertical connection P, S, and J, and the compound, on entering the feed-pipe, amalgamates with the water passing therethrough to the boiler or boilers. The source of pressure that produces the injection-jet, causing the liquid compound to leave the vessel A and pass through the vertical connection into the feed-pipes, is due to the difference in the specific gravity of the water and liquid compound, all liquids of an oily nature being lighter than water. Water being the heavier is conveyed by tube M to the bottom of the vessel A, the only liquid compound floating on the water, and is displaced and is caused to pass through the opening into vertical connection by the difference in the weight of a column of water in tube M and the weight of a column of liquid compound of equal depth in the vessel A. The water being heavier settles to the bottom and forces the liquid compound through the vertical connection at a rate proportionate to the opening of valve R.

The transparent part of the vertical connection is useful, in that it enables the attendant to ascertain if the apparatus is correctly working.

Having thus described my invention, what I claim is—

1. The combination, with the feed-water pipe for a boiler, of a vessel for injecting into the feed-pipe a liquid compound to reduce the formation of scale, a vertical tubular connection between the upper end of the vessel and the feed-pipe, and a branch connection placing the feed-pipe in communication with the lower portion of the vessel, substantially as described.

2. The combination, with the feed-water pipe for a boiler, of a vessel for injecting into the feed-pipe a liquid compound to reduce the formation of scale, a clearance-cock at the bottom of the vessel having a pipe-extension rising in the vessel, a vertical tubular connection comprising a transparent part and communicating with the vessel and the feed-pipe, and a branch connection for connecting the feed-pipe with the bottom of the vessel, substantially as described.

3. The combination, with a feed-pipe for a boiler, of the injecting-vessel having a vertical connection with the feed-pipe, which comprises a transparent portion, and a branch connection from the vertical connection to the lower portion of the vessel, substantially as described.

In testimony whereof I have signed my name to this specification in the presence of two subscribing witnesses.

ROBERT GOODBODY.

Witnesses:
THEODORE R. WEBB,
WM. R. JOHN.